Jan. 2, 1945.  C. R. PATON  2,366,254
MOTOR VEHICLE TRANSMISSION CONTROL
Filed June 14, 1939    2 Sheets-Sheet 2

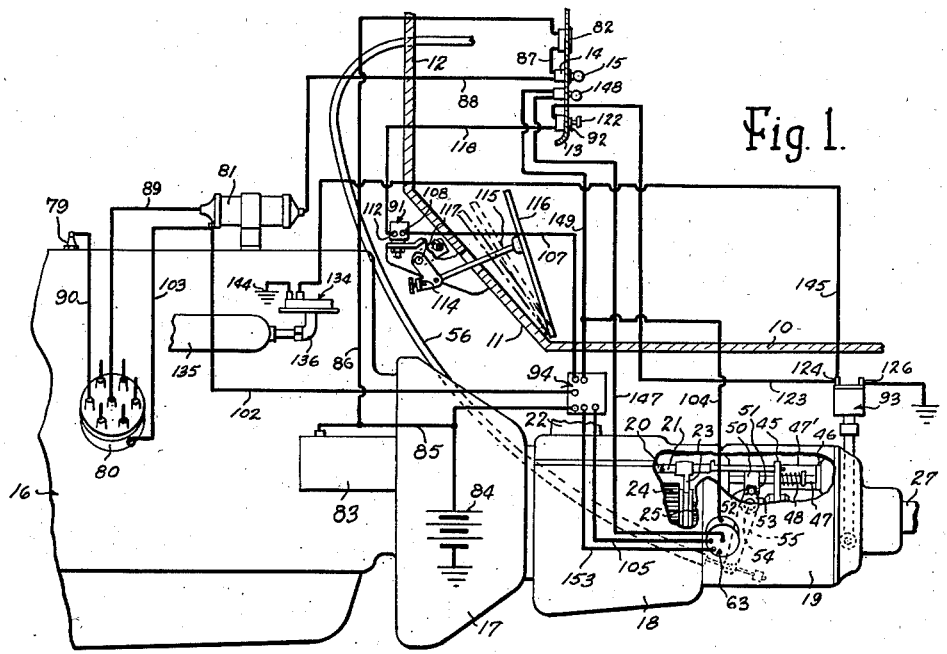

INVENTOR.
Clyde R. Paton
BY
Sibbetts & Hart
ATTORNEYS

Patented Jan. 2, 1945

2,366,254

UNITED STATES PATENT OFFICE 2,366,254

MOTOR VEHICLE TRANSMISSION CONTROL

Clyde R. Paton, Birmingham, Mich., assignor to Packard Motor Car Company, Detroit, Mich., a corporation of Michigan Application June 14, 1939, Serial No. 279,165

34 Claims. (Cl. 74—472)

This invention relates to motor vehicle transmission mechanism of the type in which the drive from change speed gearing can be modified.

An object of the invention is to provide a control for transmission drive modifying mechanism that is responsive to vehicle speed conditions or to a physical effort by the driver.

Another object of the invention is to provide an electro-magnetic control for a transmission drive modifying mechanism for vehicles that is associated with the engine ignition system to ground out and positively restore ignition after a definite interval during a drive modifying operation.

Another object of the invention is to provide an electro-magnetically actuated transmission drive modifying mechanism functioning upon a reversal of torque with a light system that is energized to indicate that the mechanism is ready for a torque reversal.

A further object of the invention is to provide an electro-magnetically actuated transmission drive modifying system with a plurality of physically operable control means and a governor operable control means that are individually operable and similarly effective.

Another object of the invention is to provide a control for an electro-magnetically actuated transmission drive modifying mechanism consisting of means operating in accordance with vehicle speed and another means operative when the vehicle is coasting to nullify the normal functioning of the speed means in a portion of its range of control.

Other objects of the invention will appear from the following description taken in connection with the drawings, which forms a part of this specification, and in which:

Fig. 1 is a diagrammatic elevational view of a motor vehicle power and transmission plant with control mechanism associated therewith;

Fig. 2 is a diagrammatic view of the ignition and control circuits when functioning to modify the drive from the change speed gearing;

Fig. 3 is a fragmentary view of the control shown in Fig. 2 when functioning to establish a direct drive from the change speed gearing;

Figure 4:
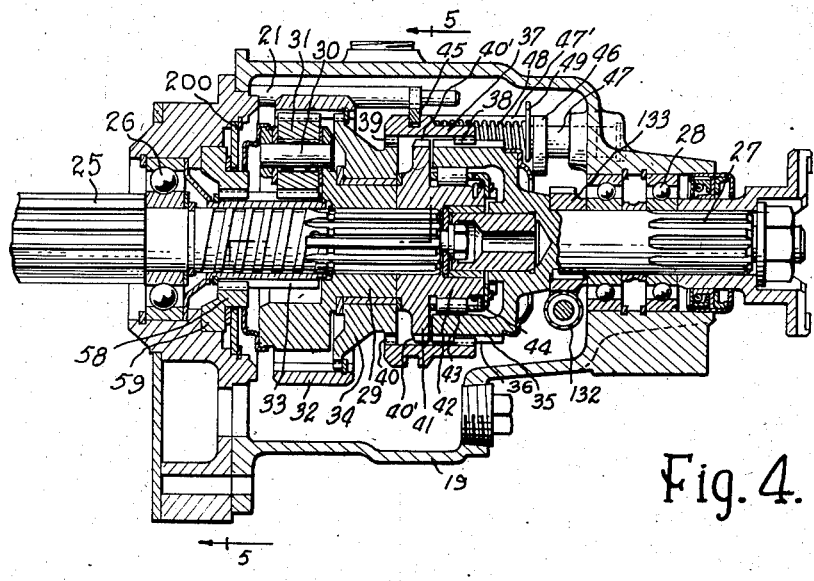
Fig. 4 is a vertical sectional view of the drive modifying mechanism.
Figure 5:
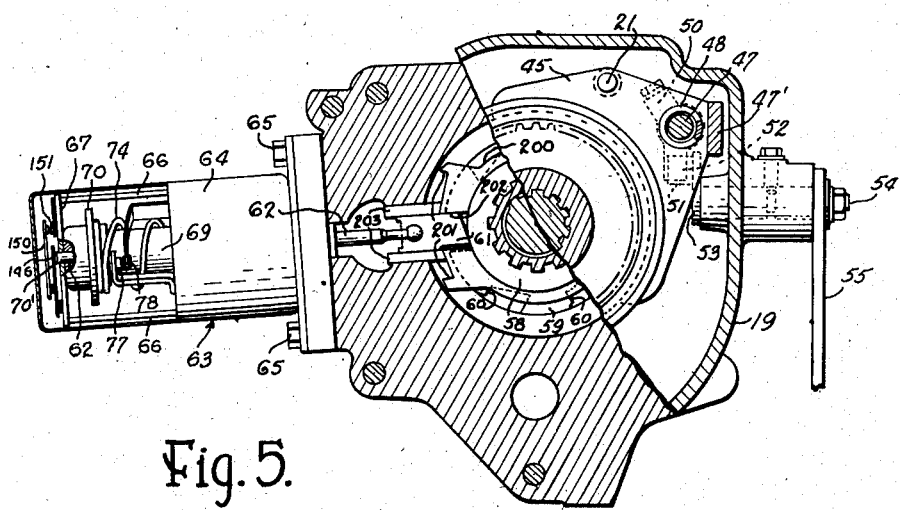
Fig. 5 is a sectional view of the drive modifying mechanism taken approximately on line 5—5 of Fig. 4.

Referring to the drawings by characters of reference, 10 represents the floor board of a motor vehicle body having at the front end thereof a toe board 11 that terminates at its forward end in a dash 12. The instrument panel 13 carries a conventional ignition switch 14 controlled by a key 15.

The power transmitting unit consists of the engine 16, the main clutch containing casing 17 at the rear of the engine, a change speed gearing casing 18 at the rear of the clutch casing, and casing 19 at the rear of the transmission mechanism casing containing drive modifying mechanism. The change speed gearing in casing 18 is conventional and is controlled by a pair of shift rods 20 and 21 actuated by conventional mechanism under the control of a shift lever (not shown) extending from the tower 22 on top of the casing 18. The shift rod 21 carries a yoke 23 that engages with and shifts a gear clutch element 24 for selectively establishing either first or reverse drive, the clutch element in its rearmost position meshing with the conventional reverse idler (not shown).

The driven shaft 25 at the rear end of the change speed gearing projects through the front wall of the casing 19 and is suitably supported therein by ball bearing 26. In axial alignment with shaft 25 is a tail shaft 27 that projects through the rear wall of casing 19 and is suitably supported therein by ball bearings 28. These shafts 25 and 27 are connected in driving relation by mechanism that can be controlled to selectively provide a direct drive between the shafts, or a modified drive from shaft 25 to shaft 27 which in this instance is overdrive, or a direct drive through an overrunning clutch. Associated with the shaft 25 is planetary gearing consisting of a cage 29, having a rearwardly extending sleeve portion splined to shaft 25, carrying journals 30 on which planet gears 31 are rotatably mounted. The planet gears mesh with internal teeth of a planetary ring gear 32 and they also mesh with the external teeth of a sun gear 33 rotatably mounted on the shaft 25. Rotatably mounted on the sleeve portion of cage 29 and fixed to rotate with the ring gear 32 by means of splines is a clutch element 34. The ring 32 and the clutch element 34 can be formed as one piece if desired.

The forward end 35 of the tail shaft 27 is enlarged and has clutch teeth 36 formed thereon. An axially shiftable clutch sleeve 37 telescopes the forward portion of this flange 35 and has internal teeth 38 that are in constant meshing driving relation with the teeth 36. At the forward end of this shiftable clutch sleeve are provided internal teeth 39 that can be moved into or out of driving engagement with teeth 40 formed on the rear end of the clutch element 34. A driving member 41 is splined to the rear of the shaft 25 between the tail shaft and the planetary cage 29. This driving member has teeth 40' similar to and arranged to align with the clutch teeth 36 so that they can be engaged by the teeth 39 of the clutch sleeve 37 when shifted to rearmost position. This driving member is formed with a rearwardly extending hub 42 provided with cam surfaces and between such cam surfaces and the interior wall of the enlarged end of the tail shaft is arranged a plurality of rollers 43 carried by a cage 44 adapted to provide an overrunning clutch connection between the member 41 and the tail shaft end 35.

The clutch sleeve 37 is shiftable manually to provide a direct connection from either the clutch element 34 or the driving member 41 to the tail shaft 27. In order to control the position of this clutch sleeve it is engaged by a yoke 45 forming one end of a U-shaped device that includes a ring 46, slidably mounted upon a shaft 47 that is mounted for limited axial movement in casing 19, and a connecting strap 47'. A coil spring 48 surrounds the shaft 47 and is anchored at its rear end to such shaft by a spring clip 49, and its front end bears against the yoke 45. Fixed on the shaft 47 in advance of the yoke is an actuator member 50 having a pair of spaced fingers 51 depending therefrom between which a cam element 52 extends. This cam element is carried by an arm 53 fixed upon the end of a shaft 54 projecting through and carried by the side wall of casing 19. Fixed to the outer end of this shaft 54 is a lever 55 and connected to the lever 55 is a Bowden wire 56 that extends to the instrument panel and terminates in a control knob (not shown).

By pulling the knob outwardly from the dash, the lever 55 is moved forwardly and rocks the shaft 54 to operate the cam 53 so that the actuator 50 fixed to the shaft 47 is moved rearwardly and as the yoke 45 lies thereagainst it is also moved rearwardly thus moving the clutch sleeve 37 rearwardly so that the teeth 39 will engage the clutch 40' of drive element 41. A direct drive is thus provided from shaft 25 to shaft 27. This same result can be accomplished when the change speed gear mechanism is associated in a reverse drive relation as shown in Fig. 1. In order to obtain reverse drive, the rail 21 is moved rearwardly and it is provided with a shouldered extension that projects into the casing 19 and pushes the yoke 45 therewith on shaft 47 so that the clutch teeth 39 will be caused to mesh with the teeth 40' on drive element 41. Except when manually shifted in the two ways just described, the clutch sleeve is engaged with the planetary ring gear clutch 34 by spring 48.

The planetary gearing is controlled by means of a device associated to lock or release the sun gear. In the present instance a collar 58 is splined to the forward end of the sun gear and such collar is provided with a flange 59 having a plurality of radially extending recesses 60 adapted to receive a brake in the form of a pawl 61 slidably mounted in the forward wall of casing 19. The pawl is normally disengaged from the sun gear collar thereby allowing the planetary gearing to idle as a unit so that a direct drive is established between the shafts 25 and 27 through the overrunning clutch. When the pawl engages the sun gear collar, the sun gear will be held stationary and the planet gear carrier being driven by shaft 25 will cause the planet gears to rotate around the sun gear so that they will drive the ring gear 32 at a faster speed than that of shaft 25. Thus the speed of the drive from the change speed gearing to the tail shaft can be direct through the overrunning clutch or stepped up while the clutch 37 is engaged with the clutch element 34. When the clutch member 37 is disengaged from the drive element 41 and the pawl is released then the drive will be from the shaft 25 to the drive member 41 and through the overrunning clutch rollers 43 to the tail shaft 27.

The pawl 61 that locks or releases the sun gear to establish overdrive or direct drive is actuated by a rod 62 under the control of an electromagnetic system including a solenoid 63. The solenoid is provided with a housing 64 secured to the side of casing 19 by bolts 65 and fixed in the housing is a pair of rods 66 to the outer ends of which is fixed a cross member 67. Centrally of the casing is fixed a bracket 68. Slidably mounted in the fixed bracket 68 is an armature 69 having a flanged cap portion 70 that covers a hollow end thereof. The rod 62 extends axially through the armature and is slidably associated therewith. On the end of the rod is a contact 70' that is grounded as indicated at 71. Within the hollow portion of the armature is a coil spring 72 that bears at one end against the cap and at the other end against a retainer 73 fixed to the pawl rod. Between the armature cap and the fixed bracket 68 is another coil spring 74 normally exerting sufficient pressure to hold the armature in extended position when the winding coils 75 and 76 of the solenoid are deenergized. The spring 72 is compressed by the armature movement, when the coils are energized, to create a sufficient force against the retainer 73, fixed to the pawl rod 62, to press the pawl into one of the recesses 60 in the sun gear collar upon a torque reverse of the sun gear.

The spring 72 when compressed by the armature is charged to move the pawl into a recess 60 in the sun gear collar but if allowed to do so while the collar is rotating breakage would occur so means is provided to block out the pawl. Frictionally associated with the sun gear is a block-out ring 200 having two spaced ears 201 extending radially therefrom. In the ring and between the ears is a slot 202 into which the pawl 61 must pass to enter one of the sun gear collar recesses. Rotation of the block-out ring is limited by a pair of plates 203 suitably anchored in casing 19 and arranged to serve as guides for the pawl. These plates project radially into the space between the ears 201 and thus limit rotation of the ring. The block-out ring travels with the sun gear collar, depending upon the direction of its rotation, until one of the ears 201 strikes against one of the guides where the ring is held and while in such position the pawl when charged will bear against the ring and is blocked from entering a sun gear collar recess. Upon reversal of torque in the planetary gearing, the block-out ring will travel in the reverse direction slowly so that the pawl will pass through the ring slot 202 and into a recess in the ring gear collar.

Winding coil 76 is arranged to have sufficient capacity to overcome the spring 74 and move the armature 69 toward the pawl 61 when energized, and the winding coil 75 is designed to have sufficient capacity to hold the armature in the extended position into which it is shifted by the primary winding coil. The winding coil 76 is connected to a contact 77 arranged to extend beyond the movement of the armature cap and in a relation to engage the grounded switch arm 78 that lies in the path of movement of the armature cap and normally engages contact 77. Thus when the armature is energized, the movement of the cap will carry the switch arm 78 therewith to disengage the same from contact 77 and thus break the circuit of the primary coil. The holding coil 75 is grounded as indicated at 79 so that it will hold the solenoid in the position it has been moved to by the coil 76 after the primary circuit to coil 76 is broken. This movement of the armature does not shift the pawl rod 62 but it does compress the spring 72 so that the spring will push the pawl rod to engage the pawl with the sun gear collar when a torque reversal permits. When the armature is released by the holding coil then the spring 74 will return it to normal position and this movement of the armature will move the retainer 73 therewith thus moving the pawl rod and the pawl to disengaged position and allowing switch 78 to move back into engagement with contact 77. Before the pawl can be disengaged from the sun gear collar a torque reversal is required and this is accomplished by grounding the motor ignition.

The engine ignition system consists of the usual elements including spark plugs as indicated at 79, a distributor 80, a coil 81, an ammeter 82, a starter motor 83, a battery 84, and the switch 14. A conductor line 85 connects the battery with the starter motor, the starter motor being grounded, and a conductor line 86 is connected with the ammeter and the conductor line 85. Between the ammeter and the ignition switch 14 is a conductor line 87. Between the coil and the ignition switch is a conductor line 88, and between the coil and the distributor is a high tension conductor 89. The distributor is connected to the spark plugs by conductor lines 90. It will be seen that the spark plugs can function only when the ignition switch is closed.

A plurality of controls for the electric system is provided. One of these controls is a foot operated switch structure indicated generally at 91, another control is a hand operated switch structure at the dash indicated generally at 92, and another of the controls is a governor operated switch structure indicated generally at 93, such controls regulating the action of the solenoid and the ignition.

In the control arrangement is a relay indicated generally by numeral 94 having two movable cores 95 and 96. The core 95 has a disk 97 fixed thereto and the core 96 has a contact disk 98 fixed thereto. The disk 97 carries insulated contacts 180 and 181 on opposite faces and is arranged intermediate the contacts 99 and 100, being normally moved for contact 181 to engage contact 100 by coil spring 101. The conductor line 86 associated with the battery and the ammeter is connected with contact 99 and a conductor line 102 connects the contact 100 with the low tension terminal of coil 81. This same coil terminal is connected with the distributor by a low tension conductor 103. The closing coil 76 of the solenoid is connected by conductor line 104 with the contact 180 and the holding coil 75 of the solenoid forms one end of a conductor line 105 that forms the winding for the relay core 96 and is connected to the conductor line 104 at 106. A conductor line 107 forms the winding for the relay core 95 and is connected to contact 99 at one end and at the other end to a contact 108 in the switch 91.

Switch 91 includes a housing 109 suitably mounted below the toe board having a slidable stem 110 projecting therefrom and carrying the contact disk 111 to establish or break the electrical connection between contact 108 and contact 112. This disk is normally pressed into engagement with the contacts within the switch housing by coil spring 113. Stem 110 projects below the switch casing and into the path of movement of an arm 114 connected by a rod 115 with the accelerator pedal 116. This arm 114 is fixed to a shaft 117 that has mechanism connected therewith for controlling the engine throttle opening. The normal operating range of the accelerator pedal is indicated in Fig. 1 between the rear full line position and the central dotted line position so when the pedal is in the full line position the engine is idling and when in the central dotted line position wide open throttle position is obtained. The pedal must be moved beyond the central dotted position as indicated in the lowermost dotted position for the arm 114 to move the stem 110 inwardly so that the contact disk 111 will be moved away from the contacts 108 and 112. Thus the switch 91 will be closed except when opened by the operation of the accelerator pedal when moved beyond the wide open throttle position.

The switch 91 is connected in series with the switch 92. Conductor line 118 connects the contact 112 with contact 119 and switch 92 includes the contact disk 120 that is arranged to normally connect contact 119 with contact 121. This switch 92 is located at the dash and is provided with a knob 122 by means of which the disk 120 can be pulled out of engagement with contacts 119 and 121.

The switch 92 is connected in series with the governor controlled switch device 93 by means of a conductor line 123 leading from contact 121 to a terminal 124 on the governor housing 125. A grounded terminal 126 leads into the governor housing and these terminals are arranged to be connected or disconnected by an over-center type of switch 127 under the control of a flexible metal strip 128 having its ends fixed to a pair of centrifugally movable weight members 129 and 130 mounted upon a shaft 131 suitably arranged to be driven by a gear 132 meshing with a gear 133 fixed on the tail shaft 27. This centrifugal governor is arranged to flatten the strip 128 to cause the switch 127 to connect terminals 124 and 126 when the vehicle gets above some predetermined speed, for example twenty-four miles per hour when change speed gearing is in high speed driving relation. When the vehicle speed falls below approximately twenty miles per hour then the strip element is bowed by the position of the centrifugal weights and the over-center switch 127 moves out of contact with terminal 126.

The closing action of the governor switch can be nullified by a device indicated generally at 134 under certain engine operating conditions. The device is preferably in parallel with the governor switch and of a type that will function to prevent the pawl from being released from the sun gear collar when the vehicle is coasting below the speed at which the governor switch opens to establish direct drive. This device can be of various types but, as illustrated, it consists of a switch under control of the vacuum conditions in the engine intake manifold 135. Tubing 136 connects the interior of the manifold with a casing 137 having its interior divided by the diaphragm 138 into two chambers. The intake manifold is in direct communication with the lower chamber while the upper chamber is open to atmosphere by means of an opening through which pin 139 extends. This pin is fixed to the diaphragm and is connected with a switch actuating element 140 that controls a conventional over-center type of switch contact member 141 adapted to engage or disengage contact 142 carried by a bracket 143 fixed on the casing 137. The casing is grounded as indicated at 144. The contact 142 is connected by a conductor line 145 with the terminal 124 of the governor. Thus when the governor controlled switch is open, and engine vacuum is high, the circuit to the holding coil 75 will be maintained and the spring 74 cannot remove the pawl from the sun gear collar. Thus direct drive cannot be established even though the governor switch is open to establish the same, and therefore free wheeling in the drive unit will not be allowed. This condition is found very desirable under certain vehicle operating conditions such as when traveling down a steep grade where it is desired to use the engine as a brake, or when coasting below the speed at which direct drive is normally established by the governor switch.

A contact member 146 is mounted on the solenoid cross member 67 and is arranged in the path of movement of the pawl rod 62. This contact member 146 is connected by a conductor line 147 with an indicator light bulb 148 secured on the dash and another conductor line 149 connects the indicator light with the contact 180. A switch member 150 is arranged to normally engage a contact 151 that is grounded as indicated at 152. This switch element 150 is connected by a conductor line 153 with a stationary contact 154 in the relay, and another contact 155 is connected by a conductor line 156 with the contact 181 of the other relay. The contact disk 98 is arranged to complete or break the circuit between contacts 154 and 155 and spring 142' normally holds the disk away from the contacts.

The clutch member 37 can be moved rearwardly to establish a direct driving connection between the drive element 41 and the tail shaft by means of the reverse gear shift rail or the manually operable Bowden wire 56 controlled at the dash, and in either case clutch member 37 engages the drive element 41 keyed to shaft 25 and the tail shaft. Under such condition the drive through the planetary or through the overrunning clutch is not possible, and with such shift the electric system to the solenoid may be disconnected by opening switch 92 if desired, however, this is necessary only in case the vehicle speed is above that at which overdrive shift would take place. Under all other conditions, the clutch member 37 establishes a driving connection between the tail shaft 27 and the driver element 34 that is splined to the planetary ring gear, such position of the clutch member 37 being maintained by spring 48.

Assuming that the clutch member 37 is in driving relation between the tail shaft and the planetary gearing and that the ignition switch is turned on, it is possible to have either a direct drive through the overrunning clutch or an overdrive through the planetary gearing. In order for the drive to be direct, the circuit to the solenoid must be broken and this can be accomplished by opening either the dash controlled switch 92 or the foot controlled switch 91. When these two switches 91 and 92 are closed then direct drive can be had when the governor switch 125 is open except when the vacuum switch is closed which will occur only when the vehicle is coasting so that there is high vacuum in the engine intake manifold.

The foot operated switch 91 and the lock-out switch 92 are in series with both the vacuum switch 134 and the governor switch 136 but the vacuum switch and the governor switch are in parallel. The circuit to the solenoid will be broken whenever the foot controlled switch or the dash controlled switch is opened. The circuit to the solenoid will also be broken when both the governor and the vacuum switches are opened. Whenever the circuit to the solenoid is broken the spring 74 will move the armature outwardly after torque reversal has taken place, and the armature will move the pawl rod therewith to disengage the pawl from the sun gear collar. When the pawl engages the sun gear collar overdrive is established through the planetary gearing, and whenever the pawl is removed from the sun gear collar then direct drive can be established from shaft 25 to shaft 27 through the overrunning clutch.

As shown in Fig. 3, the control system is de-energized so that direct drive through the overrunning clutch will take place. In Fig. 2 the control system is energized and the pawl engages the sun gear collar to provide overdrive through the planetary gearing. Overdrive is established after the vehicle reaches some predetermined speed and then torque reversal is obtained by actuating the accelerator pedal in a throttle closing direction. Under such circumstance the centrifugal weights 129 and 130 of the governor have moved in a direction to flatten out the strip 128 and engage the over-center switch 127 with the terminals 124 and 126 thus energizing the conductor line 107 and actuating the relay core 95 to move the disk so that contact 180 engages contact 99, such disk movement moving contact 181 away from contact 100. As the closing coil winding 76 of the solenoid is connected to contact 180 by line 104 it will thus be energized and the holding coil 75 will also be energized through conductor 105 that is also connected to the contact 180. Energizing the conductor 105 will move the electromagnet core 96 which moves the disk contact 98 so that contact 155 is connected to contact 154. As the solenoid closing coil 76 is energized it moves the armature 69 toward the sun gear collar against the action of the spring 74, and such movement of the armature will compress spring 72 but will not change the position of the pawl rod 62, as it is blocked, until torque reversal of the sun gear takes place and thus as contact 70' engages the switch element 146 the light circuit is established when the contact 180 is moved into engagement with contact 99. When the armature is moved, as just stated, it carries the switch element 78 therewith, as shown in Fig. 2, and thus breaks the circuit to the closing coil 76 of the solenoid. The armature remains in its adjusted position because the holding coil 75 is energized and will prevent the compressed spring 74 from returning the armature to its normal position. The pawl rod is thus held under spring pressure ready to be shot into one of the recesses of the sun gear collar when the torque on such collar is reversed so that the slot 202 in the block-out ring moves to register. This reversal of torque is obtained when the driver raises his foot on the accelerator pedal. The purpose of the light is to warn the driver that the pawl is ready to establish overdrive but that the torque reversal pedal movement must be made before the pawl can engage the sun gear collar. As soon as torque reversal takes place the compressed spring 72 will push the pawl into a recess in the collar and overdrive is established. As the pawl rod is thus moved by the spring 72 the contact 70' is disengaged from contact element 146 to open the light circuit.

When the drive mechanism is in overdrive, the shift back to direct drive can take place in several ways but due to the pressure holding the collar and pawl together there must be a torque reversal before the pawl can be withdrawn from the sun gear collar by spring 74. In the present instance this reversal of torque is obtained by grounding out the engine ignition temporarily. The arrangement is such that the grounding out is discontinued under control of the pawl rod and in addition the grounding out will be discontinued within a predetermined time limit in the event the pawl rod fails to function for this purpose. Such reestablishment of the ignition system will guarantee against motor failure.

When in overdrive the electrical system is in the relation shown in Fig. 2 so that whenever either switch 91 or 92 is opened or whenever switch 93 is opened and switch 134 is open then the circuit through conductor line 107 leading to relay contact 99 is broken and the relay core 95 is deenergized allowing spring 101 to move contact 180 away from contact 99 and engaging contact 181 with contact 100. The holding coil 75 is thus disconnected from the contact 99 and releases the solenoid armature, but as the spring 74 does not have sufficient strength to overcome the driving torque force against the pawl there must be a reversal of the torque force before the pawl is withdrawn by the spring action.

This reversal of torque is obtained whenever the circuit through conductor line 107 is broken by one of the control switches because the ignition system will be grounded out. Core 95 is deenergized so that spring 101 moves contact 180 away from contact 99 and closes contacts 181 and 100. Contacts 154 and 155 remain bridged by disk 98 because of the magnetic time delay designed in the relay and as contact 100 is connected to coil 81 by conductor line 102 and as contact 153 is connected to contact 154 the ignition system will be grounded through switch elements 150 and 151. Such ground remains until torque reversal allows the spring 74 to release the pawl and such release moves the pawl rod back to a position that disconnects switch element 150 from the grounded element 151 thereby breaking the ground-out circuit. The ignition will be normally thus restored but in case of failure for any reason then the ignition will be definitely renewed after a predetermined time interval as the disk 98 will be moved, at the completion of the magnetic time delay in the relay, by spring 142' to break the connection between contacts 154 and 155 thus opening conductor line 153.

The vacuum controlled switch is not necessary to the control system and can be dispensed with if desired. However, it is believed to be desirable when an overrunning clutch is used in the direct drive as otherwise there would be free wheeling and the engine could not be used as a brake when coasting below the governor switch cut-out speed.

The control arrangement herein described takes care of all driving conditions and is foolproof. The reversal of torque for shifting back and forth between direct and overdrive will be readily accomplished and without danger of engine stalling, and when shifting into overdrive the driver will be advised by a signal if he neglects to reverse the torque so that overdrive clutch shift can take place.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle transmission mechanism having means for establishing two driving speeds including a shiftable brake element, control means for the element including electro-magnetic means for shifting said element, governor responsive control means for said electro-magnetic means, and means operable to nullify the effect of said governor responsive control means for said electro-magnetic means in response to certain engine operating conditions.

2. In a motor vehicle transmission mechanism having a brake element shiftable to establish two driving speeds, control means for the element comprising electro-magnetic means for shifting said element, speed controlled means for said electro-magnetic means, and vacuum controlled means operable to nullify the normal effect of said speed controlled means on said electro-magnetic means during a certain engine operating condition.

3. In a motor vehicle transmission mechanism having planetary gearing selectively operable to transmit a direct drive through an overrunning clutch or a modified drive around the overrunning clutch, of means for selectively controlling said planetary gearing comprising a brake movable into and out of engagement with an element of the planetary gearing, electro-magnetic means for shifting said brake, a governor operated switch controlling the electro-magnetic means to engage and disengage said brake, and control means operable to nullify the normal effect of said governor operated switch while the vehicle is coasting below a speed at which free wheeling would normally be allowed.

4. In a motor vehicle transmission mechanism having a brake element selectively shiftable to establish two driving speeds, an electro-magnetic system for shifting said brake element after a torque reversal in the transmission mechanism, switch means operable to control said electro-magnetic system, and an indicator light circuit associated with said electro-magnetic system to be closed when said switch means is closed and to be opened when torque reversal permits shifting of said brake element after closing said switch means.

5. In a motor vehicle transmission mechanism having a brake element selectively shiftable to establish direct drive or overdrive, a rod connected to shift said brake element, an electromagnetic system for actuating said rod, an indicator light system having a switch, said rod closing said light system switch, and a switch operable to energize said electro-magnetic system and said indicator light system when closed, said rod releasing said light switch when moved in response to the energizing of said electro-magnetic system to shift.

6. In a motor vehicle transmission mechanism having a brake element selectively shiftable to establish direct drive or overdrive, a rod connected to shift said brake element after a torque reversal, an electro-magnetic system for controlling the operation of said rod, a spring urging said rod into direct drive relation, an indicator light circuit connected with the electro-magnetic system and having a switch closed by said rod when in direct drive position, a switch operable to energize said systems to obtain overdrive, said electro-magnetic system compressing said spring to urge said rod to move the brake element into overdrive position, said spring being released upon a torque reversal in the transmission and opening said light system switch when actuating said rod, and means in said electro-magnetic system for returning said rod to normal position when said electro-magnetic system switch is opened.

7. In a motor vehicle, an engine electric ignition system, a transmission mechanism brake element shiftable to control two driving speeds, an electro-magnetic system operable to shift said brake element, a ground-out connection for the ignition system, means in the electro-magnetic system establishing the ground-out connection for a predetermined time interval when such system is energized, a switch operable to control said electro-magnetic system, and a switch in said ground-out connection operable by said brake element, said brake element being adapted to open the associated switch in said ground-out connection prior to the opening action of the time interval switch.

8. In a motor vehicle, an engine electric ignition system, a transmission mechanism control element shiftable to control two driving speeds, an electro-magnetic system operable to shift said control element, including a relay and a solenoid, said solenoid being associated to shift said control element, a ground conductor line connected with the ignition system, the relay and the solenoid, two switches in the ignition ground conductor line arranged one in the relay and the other in position to be controlled by the solenoid, and control means for the electro-magnetic system.

9. In a motor vehicle, an engine electric ignition system, a transmission mechanism control element operable to control two driving speeds, an electro-magnetic system operable to move said control element and including a relay and a solenoid, said solenoid being operable to actuate said control element, a ground-out conductor line in the relay and extending adjacent the solenoid, a switch in the relay, said switch being closed when said solenoid is energized and opened a predetermined time after the solenoid is de-energized, a switch actuated by said solenoid to close and open said ground-out line in accordance with the actuation of said control element, and switch means operable to control said electro-magnetic system.

10. In a motor vehicle, an engine electric ignition system, a transmission mechanism control means operable to establish two driving speeds, an electro-magnetic system having a relay and a solenoid associated to operate said control means, a ground-out line in said ignition system controlled by said relay, and means for controlling said electro-magnetic system, said relay closing the ground-out line when the solenoid is energized and opening the ground-out line a definite interval after the solenoid is deenergized.

11. In a motor vehicle, an engine electric ignition system, a transmission mechanism control means operable to establish a modified driving speed, an electro-magnetic system including a relay and a solenoid for actuating said control means, delayed closing switch means in the relay, a ground-out line for the ignition system controlled by said relay switch means, and switch means operable to control said electro-magnetic system.

12. In a motor vehicle having a dash and an accelerator pedal, control means for an element operable to establish two driving speed ratios in a power transmission mechanism comprising an electro-magnetic circuit including a relay and a solenoid, actuator means for said element responsive to said solenoid, a switch in the circuit operable at the vehicle dash, another switch in the circuit operable by the accelerator pedal, and a governor operated switch in the circuit, said governor switch being operated in accordance with predetermined vehicle speeds, said switches all being arranged in series and each having the same effect on the circuit.

13. In a motor vehicle, an engine electric ignition system, a transmission mechanism control means operable to establish a modified driving speed, an electro-magnetic system including a relay and a solenoid for actuating said control means, a delay closing switch means in the relay, a ground-out line for the ignition system controlled by said relay switch means, and a plurality of switch means in series in the electro-magnetic system individually operable to produce the same effect upon the relay.

14. In a motor vehicle, an engine electric ignition system, a transmission mechanism brake element shiftable to establish two driving speeds, an electro-magnetic system operable to shift said brake element, a ground-out connection for the ignition system, relay means in the electro-magnetic system establishing the ground-out connection for a predetermined time interval after the system is energized, a manually controlled switch in the system, and a governor controlled switch in the system, said switches being in series and individually operable to control the system.

15. In a power transmission for driving a motor vehicle having an internal combustion engine provided with an electrical ignition circuit, driving mechanism including a sun gear, pawl means for holding or releasing said sun gear, a spring normally acting on said pawl means to release said sun gear, a solenoid operable to act against said spring to move the pawl means into holding relation with said sun gear, said pawl means being movable to engage or release the sun gear only after torque reversal, a ground line in the electrical ignition circuit for obtaining torque reversal having a self-closing switch therein, said switch being held open directly by said pawl means when in sun gear releasing position, and an electrical system connected to energize said solenoid to control said pawl means position, said system including a control switch.

16. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, means for moving the pawl into locking position against the action of said spring, a current source for operating the ignition apparatus, means for rendering the pawl moving means inoperative and for short circuiting the ignition apparatus so as to render the engine inoperative to apply torque to the overdrive to permit the spring to retract the pawl and for automatically interrupting said short circuit after the lapse of a predetermined time interval independently of movement of the pawl to non-locking position, and other means for automatically interrupting said short circuit in response to retraction of the pawl from the sun gear.

17. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, a solenoid for moving the pawl into locking position against the action of said spring, a current source for operating the ignition apparatus and solenoid, means for controlling the circuit between the current source and solenoid, and means for controlling a short circuit of the ignition apparatus and operating during a predetermined time interval after interruption of the solenoid circuit to maintain the ignition circuit short circuited so as to render the engine inoperative to apply torque to the overdrive to permit the spring to retract the pawl and finally operating to open the ignition short circuit, and other means for automatically opening the short circuit of the ignition apparatus in response to retraction of the pawl from the sun gear.

18. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, a solenoid for moving the pawl into locking position against the action of said spring, a current source for operating the ignition apparatus and solenoid, a short circuit for rendering the ignition apparatus inoperative, a solenoid relay having normally closed contacts in the ignition short circuit and having normally open contacts for connecting the current source with the solenoid, means for controlling the connection between the current source and the solenoid relay magnet coil, a measured time relay having normally open contacts in the ignition short circuit and having its magnet coil connected with the current source in response to the closing of the normally open contacts of the solenoid relay, and a switch having normally open contacts in the ignition short circuit and being closed in response to movement of the pawl into sun gear locking position, said ignition short circuit being established to relieve engine torque in response to return of the solenoid relay to normal condition while the contacts of the measured time relay and of said switch remain closed.

19. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, a solenoid for moving the pawl into locking position against the action of said spring, said solenoid having an armature-moving coil and an armature holding coil, a switch responsive to operation of the solenoid for open-circuiting the armature-moving coil, a current source for operating the ignition apparatus and solenoid, a short circuit for rendering the ignition apparatus inoperative, a solenoid relay having normally closed contacts in the ignition short circuit and having normally open contacts for connecting the current source with the solenoid, means for controlling the connection between the current source and the solenoid relay magnet coil, a measured time relay having normally open contacts in the ignition short circuit and having its magnet coil connected with the current source and in series with the holding coil of the solenoid in response to the closing of the normally open contacts of the solenoid relay, and a switch having normally open contacts in the ignition short circuit and being closed in response to movement of the pawl into sun gear locking position, said ignition short circuit being established to relieve engine torque in response to return of the solenoid relay to normal condition while the contacts of the measured time relay and of said switch remain closed.

20. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, a solenoid for moving the pawl into locking position against the action of said spring, a current source for operating the ignition apparatus and solenoid, a short circuit for rendering the ignition apparatus inoperative, said short circuit including a pair of normally closed contacts and two pairs of normally open contacts in series, means for connecting the solenoid with the current source and for separating the normally closed contacts of the short circuit, a measured time relay for closing one pair of normally open contacts of the short circuit and having its magnet coil connected with the current source by the solenoid connecting means, and means responsive to the movement of the pawl into locking position for closing the other pair of normally open contacts in the ignition short circuit, said ignition short circuit being established in response to return of the solenoid connecting means to normal condition while the other pairs of contacts remain closed.

21. In apparatus for controlling the overdrive of an automotive vehicle propelled by an internal combustion engine having electrical ignition apparatus, the combination with the sun gear of the overdrive mechanism of a sun gear locking pawl, a spring normally holding the pawl in non-locking position, a solenoid for moving the pawl into locking position against the action of said spring, said solenoid having an armature-moving coil and an armature holding coil, a switch responsive to operation of the solenoid for open-circuiting the armature-moving coil, a current source for operating the ignition apparatus and the solenoid, a short circuit for rendering the ignition inoperative, said short circuit including a pair of normally open contacts in series, means for connecting the solenoid with the current source and for separating the normally closed contacts of the short circuit, a measured time relay for closing one pair of normally open contacts of the short circuit and having its magnet coil connected with the current source by the solenoid connecting means and in series with the holding coil of the solenoid, and means responsive to the movement of the pawl into locking position for closing the other pair of normally open contacts in the ignition short circuit, said ignition short circuit being established in response to return of the solenoid connecting means to normal condition while the other pairs of contacts remain closed.

22. In apparatus for controlling an automobile overdrive having planetary gearing including a sun gear, the combination comprising a sun-gear locking pawl, a spring normally holding the pawl in non-locking position, means for moving the pawl into locking position against the action of said spring, means for rendering the pawl moving means inoperative and for rendering the engine inoperative to apply torque to the overdrive to permit the spring to retract the pawl and for automatically restoring the engine torque after the lapse of a predetermined time interval independently of movement of the pawl to non-locking position, and other means for automatically restoring engine torque in response to the retraction of the pawl from the sun gear.

23. In apparatus for controlling an automobile overdrive having planetary gearing including a sun gear, the combination comprising a sun-gear locking pawl, a spring normally holding the pawl in non-locking position, a solenoid for moving the pawl into locking position against the action of said spring, means under the control of the driver for rendering the solenoid inoperative and for causing the automobile engine ignition apparatus to be non-operative whereby the engine is inoperative to apply torque to the overdrive, and means independent of the driver for automatically restoring operation of the engine ignition apparatus after the lapse of a predetermined interval of time independently of movement of the pawl to non-locking position, and other means for automatically restoring operation of the engine ignition apparatus in response to the retraction of the pawl from the sun gear.

24. In apparatus for controlling the overdrive of an automotive vehicle propelled by an internal combustion engine having electrical ignition apparatus, the combination with the sun gear of the overdrive mechanism of a sun-gear locking pawl, a spring normally holding the pawl in non-locking position, means for moving the pawl into locking position against the action of said spring, a current source for operating the ignition apparatus, means for rendering the pawl moving means inoperative and for disconnecting the ignition apparatus from the current source so as to render the engine inoperative to apply torque to the overdrive to permit the spring to retract the pawl and for automatically restoring the connection between the current source and the ignition apparatus after the lapse of a predetermined time interval independently of movement of the pawl to non-locking position, and other means for automatically connecting the current source with the ignition apparatus in response to retraction of the pawl from the sun gear.

25. In apparatus for controlling the overdrive of an automotive vehicle propelled by an internal combustion engine having electrical ignition apparatus, the combination with the sun gear of the overdrive mechanism of a sun-gear locking pawl, a spring normally holding the pawl in non-locking position, a solenoid for moving the pawl into locking position against the action of said spring, a current source for operating the ignition apparatus and solenoid, means for controlling the circuit between the current source and solenoid, and means for controlling connections between the current source and ignition apparatus and operating during a predetermined time interval after interruption of the solenoid circuit to maintain the ignition circuit ineffective so as to render the engine inoperative to apply torque to the overdrive to permit the spring to retract the pawl and finally operating to restore the ignition circuit, and other means for automatically connecting the current source with the ignition apparatus in response to retraction of the pawl from the sun gear.

26. In a drive for engine driven mechanism having a drive shaft, a driven shaft, an overrunning clutch for connecting said shafts in direct driving relation and gearing including a sun gear for connecting said shafts in overdrive relation, a control system for the sun gear comprising a shiftable pawl for engaging and braking said sun gear, means including a solenoid for shifting said pawl in one direction, means for shifting the pawl in the other direction when the solenoid is deenergized, a current source, means responsive to a predetermined speed of the driven shaft for connecting the current source with the solenoid, and means responsive to engine intake vacuum for maintaining the connection between the current source and the solenoid when the driven shaft speed falls below that required to connect the current source with the solenoid.

27. In a motor vehicle overdrive transmission mechanism having a brake element shiftable to establish over-drive, means including a solenoid for shifting the said brake element, a current source, speed controlled circuit means for connecting the solenoid with the current source, blocker means for preventing application of the brake means without torque reversal in the mechanism through reduction in motor speed, and a signal lamp connected with the circuit means to be energized only while the solenoid is energized and the brake element is disengaged.

28. In a motor vehicle transmission mechanism having a brake element selectively shiftable to establish direct drive or overdrive, a rod connected to shift said brake element, an electromagnetic system for actuating said rod, an electric signal light system having a self-opening switch, said rod closing said switch when in direct drive position, and a switch operable to energize said electromagnetic system and said electric signal light system when closed, said rod releasing said light switch when moved to establish overdrive.

29. In a power transmission for driving a motor vehicle having an internal combustion engine provided with an electrical ignition circuit, driving mechanism including a sun gear, pawl means for holding or releasing said sun gear, a spring normally acting on said pawl means to release said sun gear, a solenoid operable to act against said spring to move the pawl means into holding relation with said sun gear, said pawl means being movable to engage or release the sun gear only after torque reversal, a ground line in the electrical ignition circuit for obtaining torque reversal having a self-closing switch therein, said switch being held open directly by said pawl means when in sun gear releasing position, and an electrical system connected to energize said solenoid to control said pawl means position, said system including a speed responsive control switch.

30. In a power transmission for driving a motor vehicle having an internal combustion engine provided with an electrical ignition circuit, driving mechanism including a sun gear, pawl means for holding or releasing said sun gear, a spring normally acting on said pawl means to release said sun gear, a solenoid operable to act against said spring to move the pawl means into holding relation with said sun gear, said pawl means being movable to engage or release the sun gear only after torque reversal, a ground line in the electrical ignition circuit for obtaining torque reversal having a self-closing switch therein, said switch being held open directly by said pawl means when in sun gear releasing position, an electrical system connected to energize said solenoid to control said pawl means position, and switches in series in said system, one of said switches being responsive to vehicle speed and the other of said switches being manually operable.

31. A motor vehicle overdrive control system comprising a planetary gearing having a sun gear, a current source, a pawl for engaging the sun gear of the overdrive, a solenoid for moving the pawl, means responsive to a predetermined vehicle speed for connecting the current source with the solenoid, and means responsive to engine intake vacuum for maintaining the connection between the current source and the solenoid although vehicle speed may fall substantially below said predetermined vehicle speed.

32. A motor vehicle overdrive control system comprising a planetary gearing having a sun gear, a current source, a pawl for engaging the sun gear of the overdrive, a solenoid for moving the pawl, means responsive to a predetermined vehicle speed for connecting the current source with the solenoid, means responsive to a predetermined accelerator pedal position for disconnecting the solenoid from the current source to obtain quick acceleration, and means responsive to engine intake vacuum for maintaining the connection between the current source and the solenoid although the vehicle speed may fall substantially below said predetermined vehicle speed, said last mentioned means being rendered inoperative by quick opening of the engine throttle.

33. A motor vehicle overdrive control system comprising a current source, planetary gearing having a sun gear, a pawl for engaging the sun gear of the overdrive, a solenoid for moving the pawl, means responsive to a predetermined vehicle speed for connecting the current source with the solenoid, and means responsive to engine intake vacuum for connecting the current source with the solenoid, said speed and vacuum responsive means being connected in parallel.

34. A motor vehicle overdrive control system comprising planetary gearing having a sun gear, a current source, a pawl for engaging the sun gear of the overdrive, a solenoid for moving the pawl, means responsive to a predetermined vehicle speed for connecting the current source with the solenoid, throttle controlled means in series with the speed controlled means, and means responsive to engine intake vacuum connected in parallel with said speed responsive means.

CLYDE R. PATON.